United States Patent
Raz et al.

(10) Patent No.: US 11,092,492 B2
(45) Date of Patent: Aug. 17, 2021

(54) PROJECTOR IMAGING SYSTEM WITH AUTO-HOMING TUNABLE FILTER

(71) Applicant: Unispectral Ltd., Ramat Gan (IL)

(72) Inventors: Ariel Raz, Kfar Vradim (IL); Efrat Immer, Tel-Aviv (IL)

(73) Assignee: UNISPECTRAL LTD., Ramat Gan (IL)

( * ) Notice: Subject to any disclaimer, the term of this patent is extended or adjusted under 35 U.S.C. 154(b) by 0 days.

(21) Appl. No.: 16/648,187

(22) PCT Filed: Sep. 20, 2018

(86) PCT No.: PCT/IB2018/057250
§ 371 (c)(1),
(2) Date: Mar. 17, 2020

(87) PCT Pub. No.: WO2019/058298
PCT Pub. Date: Mar. 28, 2019

(65) Prior Publication Data
US 2020/0264049 A1    Aug. 20, 2020

Related U.S. Application Data

(60) Provisional application No. 62/623,846, filed on Jan. 30, 2018, provisional application No. 62/560,690, filed on Sep. 20, 2017.

(51) Int. Cl.
*G01J 3/32* (2006.01)
*G01J 3/28* (2006.01)
(Continued)

(52) U.S. Cl.
CPC .............. *G01J 3/32* (2013.01); *G01J 3/2823* (2013.01); *H04N 5/2254* (2013.01); *H04N 5/2354* (2013.01)

(58) Field of Classification Search
CPC .... G01J 3/32; G01J 3/2823; G01J 3/26; G01J 1/4204; G01S 17/04
See application file for complete search history.

(56) References Cited

U.S. PATENT DOCUMENTS

| | | | |
|---|---|---|---|
| 2005/0030545 A1* | 2/2005 | Tuschel | G01J 3/10 356/454 |
| 2008/0252882 A1 | 10/2008 | Kesterson | |
| 2018/0209850 A1* | 7/2018 | Raz | G01J 3/0264 |

FOREIGN PATENT DOCUMENTS

| | | |
|---|---|---|
| EP | 2560374 A1 | 2/2013 |
| WO | 2008055621 A2 | 5/2008 |

(Continued)

*Primary Examiner* — Maurice C Smith
(74) *Attorney, Agent, or Firm* — Kenealy Vaidya LLP

(57) ABSTRACT

Some embodiments are directed to an imaging that includes an image sensor; a tunable filter; and a controller operatively connected to the tunable filter and to the image sensor. The imaging system is configured to: tune the tunable filter to a plurality of filter states. The image sensor acquires, at each state of the plurality of states, an image of an object, to provide different images of the object. The controller calculates a state related score, for each state that is indicative of one or more properties of at least one subset of pixels of the at least one image acquired at the state, to provide a plurality of state related scores; and determines, based on at least one of the plurality of state related scores, a desired state of the tunable filter that satisfies a desired state related score criterion; and sets the tunable filter.

20 Claims, 17 Drawing Sheets

(51) Int. Cl.
*H04N 5/225* (2006.01)
*H04N 5/235* (2006.01)

(56) References Cited

FOREIGN PATENT DOCUMENTS

WO    2017009850  A1    1/2017
WO    2017017684  A1    2/2017

* cited by examiner

PRIOR ART

PROJECTOR IMAGING SYSTEM WITH AUTO-HOMING TUNABLE FILTER

CROSS REFERENCE TO RELATED APPLICATIONS

This application is a national phase filing under 35 C.F.R. § 371 of and claims priority to International Application No. PCT/IB2018/057250, filed on Sep. 20, 2018, which claims the priority benefit under 35 U.S.C. § 119 of U.S. Provisional Patent Application Nos. 62/623,846 and 62/560,690 filed on Jan. 30, 2018 and Sep. 20, 2017 respectively, the contents of each of which are hereby incorporated in their entireties by reference.

BACKGROUND

Some embodiments of the presently disclosed subject matter relate in general to imaging systems or devices and in particular to infrared (IR) projector imaging systems or devices.

A standard IR projector imaging system or device normally includes at least one IR light source (e.g. LED or VCSEL) and an IR imager that includes an image sensor (e.g. CMOS) in series with a fixed IR band pass (BP) filter which is compatible with a specific wavelength of the IR light source. The IR images may be designed for example to work in the near IR range, where the term "near IR" refers to a wavelength range as commonly understood in the art, for example the range 750-1400 nm. Known fixed IR BP filters are optimized such that they transmit most of the light emitted from the light source while minimizing the leakage of ambient light into the sensor. While minimized ambient light leakage, such fixed BP filters still allow significant ambient light to reach the image sensor.

The emission spectra of any light source vary due to factors such as manufacturing tolerances and thermal drift. For example, the wavelength associated with the peak in the spectra of a Princeton Optronics Large Divergence 945 nm VCSEL Array Module (PCW-SMV-2-W0945-1-D60-45) could vary by ±10 nm due to manufacturing tolerances and by an additional ±3 nm due to thermal drift over a ±40° C. change in ambient temperature. The corresponding manufacturing tolerances and thermal drift values for an Osram 810 nm LED SFH 4780S are ±13 nm and ±12 nm, accordingly.

In order to assure that a sufficient amount of the light source energy reaches the image sensor of the system, the light source's possible spectral shift should be accounted for, and thus band-pass filters in such applications are generally designed with a full width at half maximum (FWHM) equal to at least the sum of the FWHM of the light source spectra and the amount of possible spectra shift. However, using a band-pass filter with a FWHM greater than that of the light source increases the ambient light leakage into the sensor and may results in a low system performance.

As an example, the nominal spectra of Osram's 810 nm LED SFH 4780S is depicted in FIG. 1A. Its FWHM is approximately 30 nm and the total drift is ±25 nm. Combined with a typical sun ambient lighting at sea level, given in FIG. 1B, its resulting spectra is shown in FIG. 1C. That same figure also shows such a combination for the case in which the LED spectrum has a drift of +25 nm. In view of the problem explained above and in order to accommodate for any possible drift in the LED spectrum, an IR band-pass filter needs then to be designed with a FWHM value of at least 80 nm—which is more than double the nominal LED FWHM value.

A common figure of merit for ambient light leakage is the Energy Ratio (ER), defined as the ratio between the energy in the wavelength range corresponding to the FWHM of the light source and the total energy reaching the image sensor. However, measuring ER directly in such system is not feasible without apriori knowledge of the exact ambient light characteristics. Thus, this measure is usually only used to assess the performance of such systems under laboratory conditions.

FIG. 1D depicts the spectra resulting from the combination of the nominal lighting spectrum of the LED of FIG. 1A with the ambient lighting spectrum of FIG. 1B. Black filled areas represent the light leakage through a band pass filter with a FWHM of ca. 80 nm required to accommodate a possible drift in the LED spectra. The ER value calculated based on the total amount of light passing through such a filter and the amount of light leaking through it is expected to be approximately 50%, which is considered to be low, causing poor system performance.

Therefore there is a need for, and it would be advantageous to have a projector imaging system including a tunable IR band pass filter (also referred to as simply as "tunable filter") that has a similar FWHM to that of a respective light source and which can be adjusted according to a drift in the spectra of the light source, thus enabling to transmit the same amount of light source energy while reducing the leakage of ambient light in comparison with the performance of an equivalent fixed filter with optimal design.

Furthermore, computer vision cameras can be classified as cameras that output images later processed by a processor. These cameras include automotive cameras, security cameras etc, and in some cases the goal is not to capture a color image (including all or most RGB planes). As most cameras, the image sensors have a pre-defined color filter array which may be included of two or more colors. These cameras, inherently suffer from this constraint of capturing only pre-defined colors, trade off resolution with color information (e.g., 25% pixels sample red and 75% of pixels sample white/clear). Also, special algorithms of de-mosaicking are needed to interpolate the different color planes into full-resolution images. This process usually requires hardware acceleration and induces latency which undesirable for moving systems.

Moreover, standard computer vision and image processing algorithms usually rely on the color channels supported by the color filter array on the image sensor. Common examples include RGB cameras (common in mobile handsets, in which 3 color planes are captured) and red-clear camera (common in automotive cameras, 2 color planes). It is well known that these algorithms could improve their performance if additional information will be available, such as additional color planes.

SUMMARY

Some embodiments of the presently disclosed subject matter therefore relate to imaging systems, including projector imaging systems, which include auto-homing tunable filters, and to methods of use of such systems and tunable filters.

As used herein, "auto-homing" refers to automatic tuning of the filter to a filter state. As disclosed herein below auto-homing is implemented in a manner that helps to improve performance of the imagining system. For example, by increasing (e.g. maximizing) the amount of light originating from the projector that reaches the image sensor of the imaging system and reducing (e.g. minimizing) leakage.

According to the presently disclosed subject matter, a tunable filter such as a tunable IR band pass filter is provided, having a similar FWHM to that of the light source, which can be adjusted according to a drift in the spectra of the light source, thus enabling to transmit the same amount of light source energy while reducing the leakage of ambient light in comparison with the performance of an equivalent fixed filter with optimal design. That is, the tunable IR band pass filter can auto-home into a filter state that allows it to increase transmission of the light emitted from a light source while reducing leakage of ambient light into an image sensor. Moreover, projector imaging systems working in wavebands other that IR (for example visible (VIS)) may similarly benefit from band pass filters in the respective wavebands that are optimized to increase transmission of light emitted from a light source while minimizing leakage of ambient light into an image sensor.

In some exemplary embodiments, there are provided projector imaging systems including a light source for emitting light in a required wavelength band, an image sensor, a tunable filter configured to auto-home into a particular filter state that reduces (e g minimizes) ambient light leakage into the image sensor, and a controller operatively connected to the tunable filter and to the image sensor and configured to determine the particular filter state, to control the tunable filter and to operate the imaging system for capturing an image.

In some embodiments, the required wavelength band includes an IR wavelength band.

In some embodiments, the IR wavelength band includes a near-IR wavelength band.

In some embodiments, the required wavelength band includes a visible (VIS) wavelength band.

In some embodiments, the controller may be configured to determine the particular filter state includes a configuration to sweep the tunable filter through a plurality of tunable states in the vicinity of a nominally predetermined state $x_0$ and to find a local maximum of a cost function $I_T(x)$ corresponding with the particular filter state.

In some embodiments, the controller is further configured to set the tunable filter to the particular filter state prior to operating the imaging system for capturing an image.

In some embodiments, the tunable filter is a MEMS tunable filter.

In some embodiments, the controller may be configured to sweep the MEMS tunable filter through a plurality of tunable states in vicinity of a nominal predetermined state $x_0$ and to find a local maximum of a cost function $I_T(x)$ corresponding with the particular filter state.

In some embodiments, the controller is further configured to set the MEMS tunable filter to the particular filter state prior to operating the imaging system for capturing an image.

According to another example there may be provided an imaging system may include an image sensor; a tunable filter; and a controller operatively connected to the tunable filter and to the image sensor and configured to tune the tunable filter through a plurality of filter states within a certain wavelength band; calculate for an image output of each state of the plurality of states a respective score; select based on the calculated score a particular filter state out of the plurality of filter states that satisfies a desired state related score criterion; and set the tunable filter to the desired state that minimizes ambient light leakage into the image sensor; and operate the imaging system for capturing an image while the tunable filter may be tuned in the particular state.

In some examples the imagining system may include a light source configured for transmitting light in a desired wavelength band, smaller than the certain wavelength band, wherein the certain wavelength band may be determined according to the desired wavelength band of the light source and an expected drift around the desired wavelength band.

In some examples the score may be indicative of ambient light absorbed by the image sensor relative to light in the desired wavelength band absorbed by the image sensor.

The score may be an output value of a cost function and the controller may be configured to calculate a cost function output value for each of the plurality of states.

There may be provided an imaging system that may include an image sensor, a tunable filter, and a controller operatively connected to the tunable filter and to the image sensor and configured to determine a particular filter state that minimizes ambient light leakage into the image sensor, and operate the imaging system for capturing an image.

The imaging device may include a light source for emitting light in a required wavelength band.

The required wavelength band includes an infrared (IR) wavelength band.

The IR wavelength band includes a near-IR wavelength band.

The required wavelength band includes a visible (VIS) wavelength band.

The controller may be configured to sweep the tunable filter through a plurality of tunable states in vicinity of a nominal predetermined state x and to determine a local maximum of a cost function $I_T(x)$ corresponding with the particular filter state.

The controller may be configured to set the tunable filter to the particular filter state prior to operating the imaging system for capturing an image.

The tunable filter may be configured as a MEMS tunable filter.

There may be provided a method for acquiring images by an imaging system that may include an image sensor and a tunable filter, the method, may include determining a particular filter state that minimizes ambient light leakage into the image sensor; setting the tunable filter to the particular filter state; and obtaining image data with the filter set to the particular filter state.

The determining of a particular filter state includes configuring a controller of the projector imaging system to determine the particular filter state.

There may be provided a method for setting a tunable filter, the method may include tuning, at different points in time, a tunable filter to different states for passing different frequency ranges; at each state acquiring at least one images of an object, by an image sensor, to provide different images of the object, wherein the acquiring occurs while a radiation source illuminates the object; and selecting a selected setting of the tunable filter based on one or more properties of one or more images of the different images.

The method may include selecting the selected image to fulfill a desired relationship between (a) radiation from the object that originated from the radiation source and may be sensed by the image sensor, and (b) ambient radiation sensed by the image sensor.

The desired relationship may include having a maximal amount of radiation from the object that originated from the radiation source and a minimal amount of the ambient radiation The desired relationship may include a maximal ratio between (a) an intensity of the radiation from the object that originated from the radiation source and (b) an intensity of the ambient radiation.

The tunable filter may be a narrowband filter having a bandwidth that may be smaller than nanometer.

The different states consist of a first state and a second state.

The different states may include at least three states.

The one or more properties may be a signal to noise ratio.

The one or more properties may be a contrast.

The selecting of the setting may include applying a cost function on the one or more properties of a subset of pixels of the one or more images.

The cost function may be an average intensity of pixels of the subset.

The method may include selecting pixels that belong to the subset.

The tunable filter may be a narrowband filter having a bandwidth that equals a bandwidth of the radiation.

The tunable filter may be a narrowband filter having a bandwidth that differs from a bandwidth of the radiation.

The method may include acquiring images while the tunable filter may be set to the selected setting.

The radiation source may exhibits a frequency drift.

There may be provided an imaging system that may include an image sensor, a tunable filter, and a controller operatively connected to the tunable filter and to the image sensor and configured to tune, at different points in time, a tunable filter to different states for passing different frequency ranges; wherein the image sensor may be configured to acquire, at each state, at least one image of an object, to provide different images of the object; wherein the acquiring occurs while a radiation source illuminates the at least part of the object; and wherein the controller may be further configured to select a selected setting of the tunable filter based on one or more properties of one or more images of the different images.

Imaging systems may include a tunable spectral filter placed between the detector (either a single pixel or a pixel matrix) and the scene. These imaging systems may include a tunable spectral filter for either improving its performance or enhancing its functionality.

Examples an imaging system may include a detector in which includes a tunable spectral filter whereas the filter maximizes the ratio between light that is projected by an illuminator on the scene and ambient light. This class of imaging systems may include an IR camera that should collect the light emitted by a VCSEL/LED illuminator where the detector is a CMOS image sensor.

The imaging system may be included in a LIDAR system in which the detector (e.g., SiPM, SPAD etc.) collects a light beam (that may be stirred), emitted by an illuminator such as a Laser.

The imaging systems may have an integrated tunable spectral filter.

The imaging system may often be required to operate in uncertainty conditions. Such uncertainty may include for example CW variability of the illuminator, different ambient lightings (intensity and/or spectrum) and others. Thus, having a tunable spectral filter which is adaptive and can accommodate for uncertainty can improve overall system performance.

The adaptiveness of such an imaging system may require the detector to collect light and a processor to perform some statistical analysis of the measurement. The nature of this analysis can vary across different systems that need to perform different tasks. Then, the spectral filter can be tuned once or more until the statistical analysis either maximizes a figure of merit or have reached a pre-determined acceptable level.

For example, for an IR camera that should capture a scene illuminated by an LED, the statistical analysis will measure the intensity.

An imaging system may be included in a system which navigates based on an input from a camera and for that purpose requires to find edges of objects. This system would benefit from tuning the spectral filter to yield the spectral profile in which the objects' edges are sharpest (highest image contrast).

The imaging system may be used in an environment which undergoes fast changes ambient light intensity (e.g., when a car enters and exits a tunnel). In such case, the spectral filter will be tuned to the wavelength which minimizes the ambient light intensity variation.

BRIEF DESCRIPTION OF THE DRAWINGS

Non-limiting examples of some embodiments of the presently disclosed subject matter are described below with reference to figures attached hereto that are listed following this paragraph. The drawings and descriptions are meant to illuminate and clarify some embodiments of the presently disclosed subject matter, and should not be considered limiting in any way. In the drawings.

DETAILED DESCRIPTION OF EXEMPLARY EMBODIMENTS

Any reference to an image of an object may be applied mutatis mutandis to an image of a part of the object.

Any reference to an image may be applied mutatis mutandis to any number of pixels of the image.

Figure 1A:
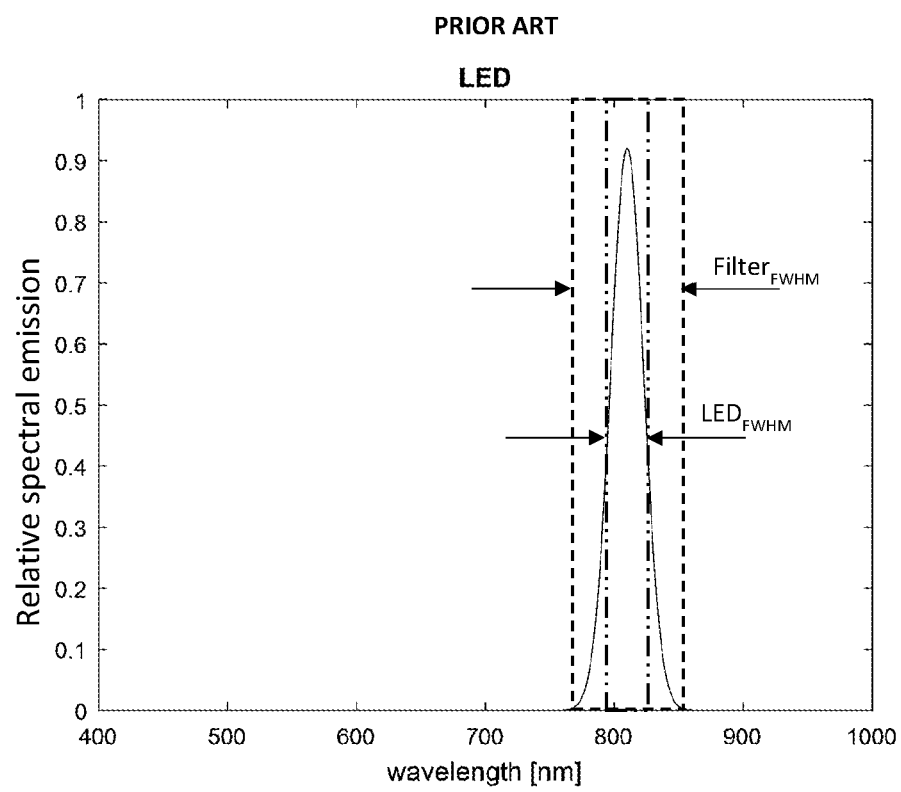
FIG. 1A depicts an approximate curve of the nominal spectra of an Osram 810 nm LED SFH 4780S, together with the desirable FWHM of an accompanying band pass filter.
Figure 1B:
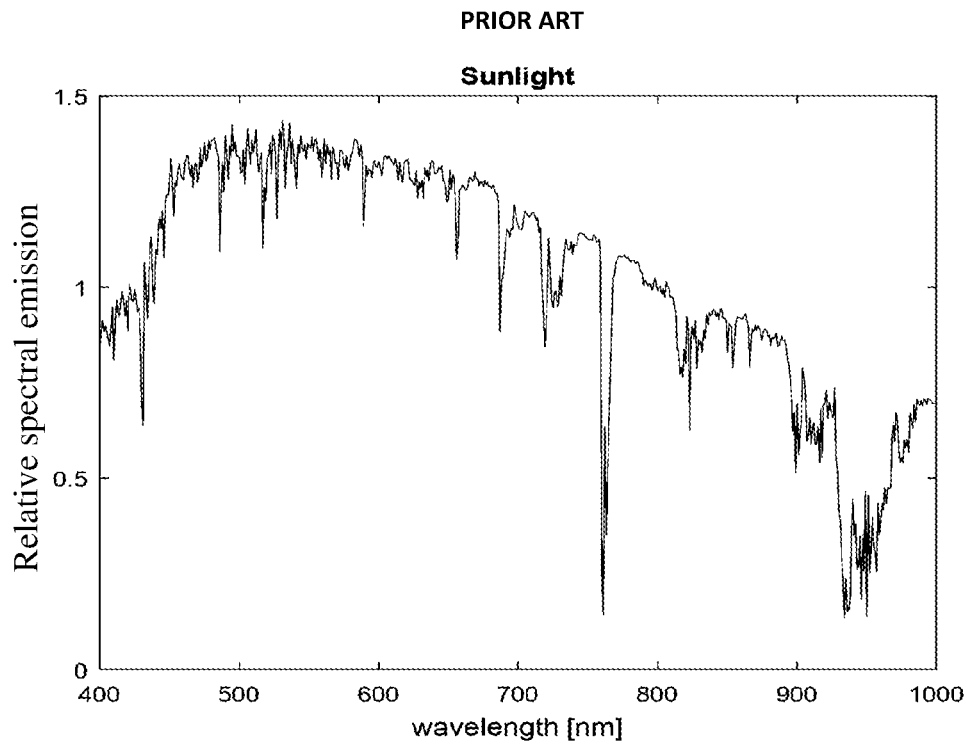
FIG. 1B depicts the typical spectrum of the sun ambient lighting at sea level.
Figure 1C:
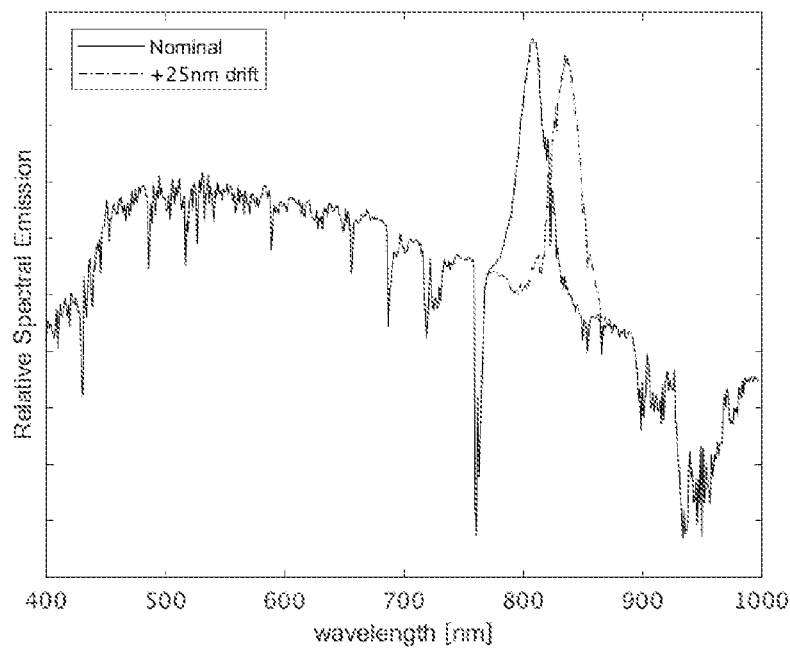
FIG. 1C depicts the spectra resulting from the combination of the nominal and drifted lighting of the LED of FIG. 1A with the ambient lighting of FIG. 1B.
Figure 1D:
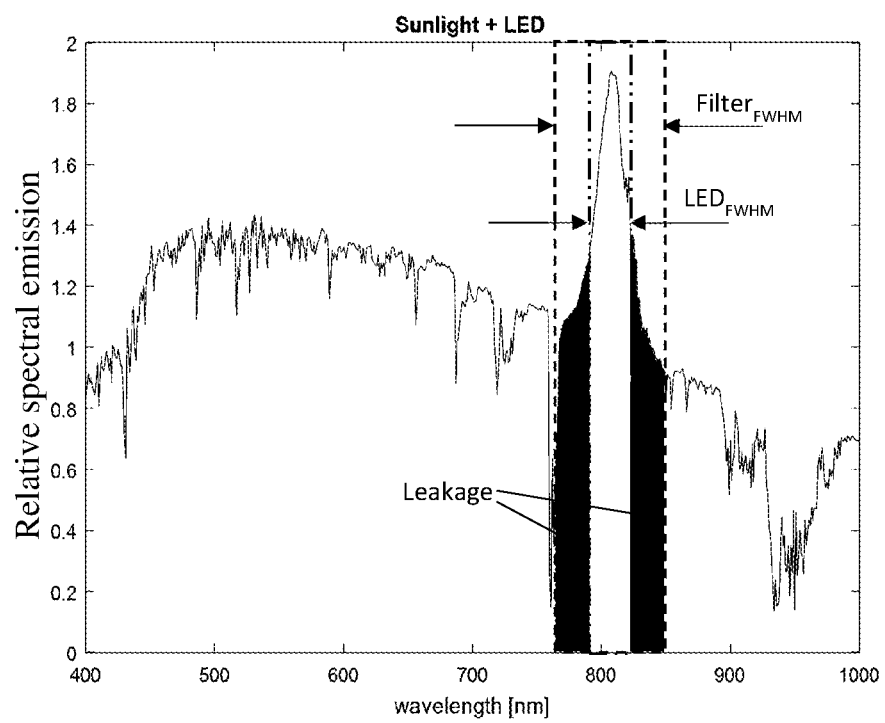
FIG. 1D depicts the spectra resulting from the combination of the nominal lighting of the LED of FIG. 1A with the ambient lighting of FIG. 1B.
Figure 2A:
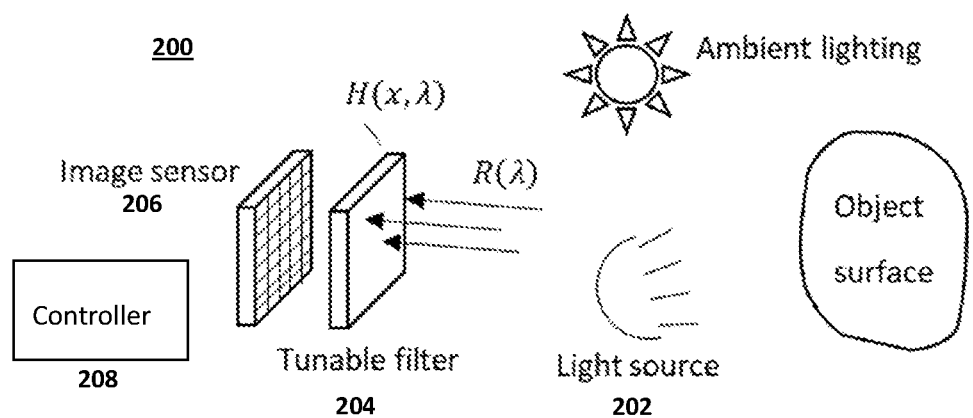
FIG. 2A illustrates graphically some embodiments of a projector imaging system disclosed herein, according to some examples.

FIG. 2A illustrates graphically some embodiments of a projector imaging system or device 200 disclosed herein. System 200 includes a light source (e.g. LED, VCSEL) 202, a tunable band pass filter (e.g. a MEMS-based tunable etalon) 204, an image sensor (e.g. CMOS) 206, and a controller 208. While applicable for imaging in various wavelength bands, the following description of the system and method of use are focused for simplicity on the IR band. The system according to the presently disclosed subject matter, enables to augment (and possibly optimize) its image output (specifically IR image output) by decreasing the ambient lighting leakage into the image sensor and by increasing IR absorption at the image sensor. Controller 208 is operatively connected to tunable filter 204 and to image sensor 206, and configured to control the tunable filter, operate the imaging device for capturing an image, and determine a selected filter state which provides reduced (e g minimized) ambient light leakage into the image sensor, as described in more detail below.

An example of a tunable filter that can be used for example for sequential imaging is an etalon. An etalon includes two parallel mirrors. The spectral transmission profile is determined by the gap between the mirrors. The tuning of a voltage applied to etalon tunes the gap between the mirrors (which provides a so called "optical cavity") and, in turn, tunes the spectral transmission profile. The two mirrors may be for example a semi-transparent front mirror and a semi-transparent back mirror. In some examples, the back mirror may be, for example, stationary while the front mirror may be movable toward/away from the back mirror in order to change the distance (optical cavity) between them, and thereby tune the spectral transmission profile. Tunable filters can includes for example, microelectromechanical system (MEMS) tunable filters such as the MEMS Fabri-Perot filter. An example of such a tunable filter is disclosed in patent applications published as WO 2018/092104 and WO 2017/009850 of the Applicant, which is incorporated herein by reference in its entirety.

Figure 2B:
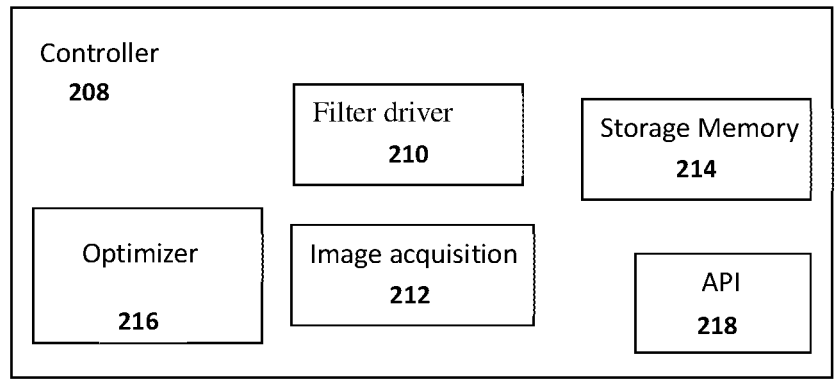
FIG. 2B shows schematically the structure of a controller in the projector imaging system of FIG. 2A, according to some examples.

FIG. 2B illustrates schematically in a block diagram the structure of a controller 208. The controller may include a filter driver 210 responsible for tuning the filter to a filter state, an image acquisition module 212 responsible for operating and obtaining images from the image sensor, a storage memory module 214 that may serve to temporarily store the acquired images, and an optimizer 216 responsible for calculating the cost function for each of the stored images and to accordingly determine and select an optimized filter state. Memory module 214 can also be used for storing the wavelength range of the light source and an expected drift range, which can be updated using an optional application input interface (API) module 218, based on the specific type of light source.

The optimization or augmentation of performance in imaging system 200 can be achieved for example, by defining a measurable figure of merit ("cost function") $I_T(x)$, which is optimized by sweeping the tunable filter through several of its tunable states in vicinity of a nominal predetermined state $x_0$ (assuming no drift in the light source) and by finding the local maximum of $I_T(x)$ corresponding with a state $x_m$ of the filter. Vicinity may be regarded based on an actual or expected frequency drift of the radiation source, may be regarded as within 10%, 20%, 30%, 40% from the nominal state, and the like.

The several tunable states may be two states, three states, four states or more than two states. For example—the tunable filter may operate in a binary manner—and the sweeping may include or can consist of operating in a first state and then operating in another state. The first state may provide a band pass filter at the range of 600-800 nm and the second state may provide a band pass filter at the range of 300-500 nanometers. Other bandpass ranges may be provided.

The number of the several tunable states may depend on the type of tunable filter. For example, a tunable filter may exhibit a tradeoff between cost of the tunable filter (or size of the tunable filter) and functionality—as reasonable cost tunable filters may be limited in the number of different states.

In some examples, the relevant states range (wavelength band or range) for sweeping the filter is calculated in advance according to the wavelength of the IR light source and the expected drift of the light source. For example, for a 810 nm light source with an expected spectra drift of up to ±25 nm, the relevant filter states range would correspond to a transmission peak range in the range of 785-835 nm. This range can then be divided into N−1 equal intervals, and the filter would then be swept through each of the N corresponding states, where for each state the cost function $I_T(x)$ is calculated and registered.

In one example, the states range can be provided to controller 208 as input from an external resource. In another example, controller 208 can be configured to calculate the states range based on the wavelength range of the light source and an expected drift range. Data indicative of the state range can be stored for example, in memory module 214.

According to one example, $I_T(x)$ is defined as the system total intensity signal which is a function of all or most intensity readings in a subset of the sensor's pixels.

The subset of pixels may be selected in any manner, may be selected in advance, may be selected after image processing, and the like. The selection of the subset may change over time, and the like.

The subset of pixels may be of any number of pixels, of any shape and/or of any size. The subset may be selected based on an image processing of one or more images, may be based on an intensity histogram, may be based on previous selections of subsets of pixels, may be based on information not included in the one or more images (such as a time of day and/or location—as ambient light may change over the day, may change between one country to another), and the like.

The subset of pixels may include a predefined number of pixels located at the center of the image—or in any other location. The subset of pixels may include pixels that are adjacent to each other, may include pixels that are spaced apart from each other, may include different spaces apart groups of pixels wherein each group of pixels includes pixels that are adjacent to each other.

The subset may include pixels that exhibit a certain property—such as pixels that belong to a region of the image that exhibits a certain property—such as being of a highest intensity region. The highest intensity region may include the highest intensity pixels, may be of a highest average intensity out of all or most regions of the image, and the like.

In some examples an image may be acquired and the cost function may be applied on one or more regions of the image. The outcome of the applying of the cost function on the one or more regions may be evaluated to see which region should be selected—or whether a previous selection of the region was appropriate.

The subset of pixels may be denoted $[m_i, n_i]$, where i=1 . . . k is the index of a pixel in that subset. For example, $I_T(x)$ may be defined as a weighted sum of the intensities in the pixels subset $[m_i, n_i]$.

According to another example, $I_T(x)$ is defined as the image contrast for the pixel subset $I=[m_i, n_i]$, given by:

$$I_T(x) = \frac{\text{Percentile}(I, 90) - \text{Percentile}(I, 10)}{\text{Percentile}(I, 90) + \text{Percentile}(I, 10)}$$

where Percentile(I,p) returns the gray level value corresponding to the p-th percentile of the image I. To clarify, the $90^{th}$ and $10^{th}$ percentiles provided are just an example, and other values of p can be used for other cases.

There may be provided any cost function. The cost function should be applied on one or more properties of pixels of the subset of pixels—or on a larger group of pixels (for example—on pixels of the entire image).

The cost function may take into account a signal to noise ratio (SNR) of pixels of the subset, or an intensity of pixels of the subset.

The cost function may take into account multiple properties of pixels of the subset of pixels.

Figure 2C:
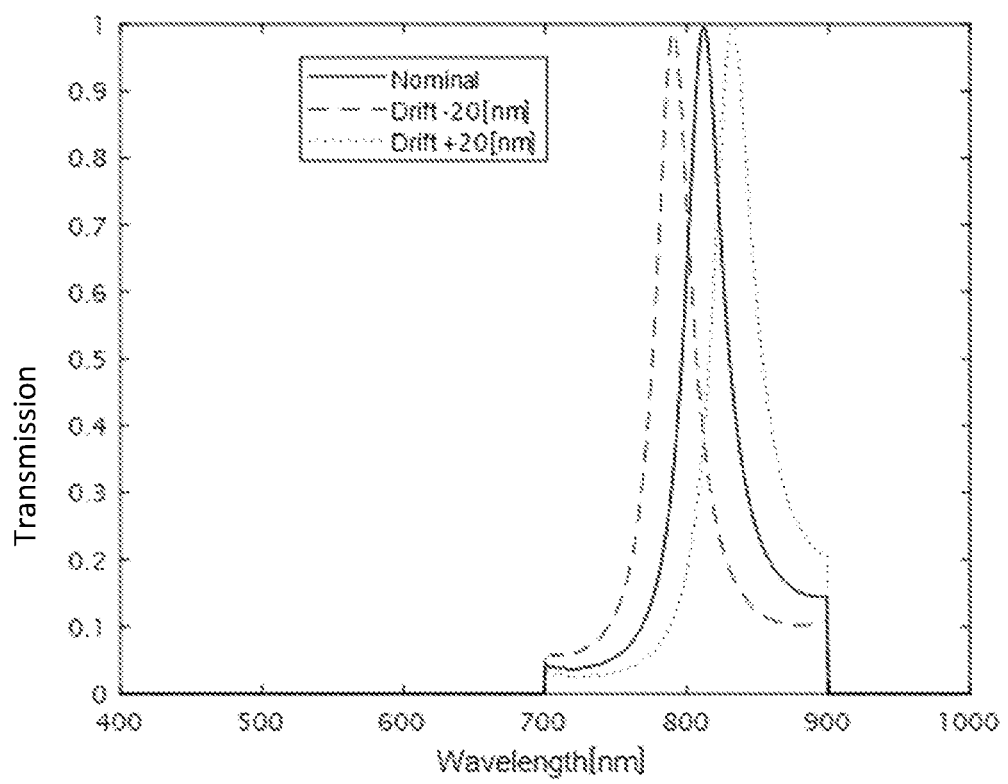
FIG. 2C shows exemplary transmission curves obtained with the system of FIG. 2A for 3 different tunable filter states with center wavelengths of 790, 810, and 830 nm.

FIG. 2C shows exemplary transmission curves obtained with system 200 for 3 different tunable filter states: 790, 810, and 830 nm. These states can cover a possible drift of ±20 nm in Osram's 810 nm LED SFH 4780S0.

Figure 3:
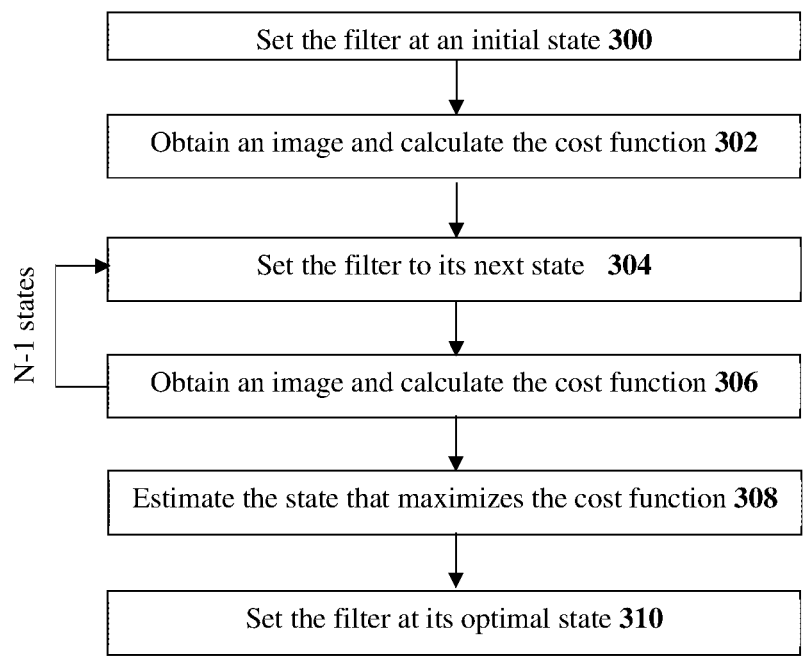
FIG. 3 presents a flow chart illustration of operations carried out according to some examples of the presently disclosed subject matter.

FIG. 3 is a flow chart illustration of operations carried out according to some examples of the presently disclosed subject matter. Operations described with reference to FIG. 3 can be carried out for example by a system designed according to the principles described above with reference to FIGS. 2A-2C.

The filter is set to an initial state in step 300 (e.g. by filter driver module 210). An image is obtained (e.g. by image acquisition module 212) in the initial state and in step 302 the cost function is calculated (e.g. by optimizer module 216) for example according to one of the functions described above. The filter is then set to a next state in step 304 (e.g. by filter driver module 210). An image is obtained (e.g. by image acquisition module 212) in the respective next state and, in step 306, the cost function is calculated (e.g. by optimizer module 216) for example as described above. Steps 304 and 306 are repeated N−1 times, where N≥2 (e.g. with controller 208).

In step 308, based on the cost function values calculated for each of the different (N) states, a particular state out of the N states is selected.

For example, the selected state can be the one that maximizes the cost function (e.g. by optimizer module 216), and in step 310 the filter is tuned to the selected state (e.g. by filter driver module 210). As an alternative, the cost function can be calculated each time (e.g. by optimizer module 216) and compared to the previous result, and the result with the higher cost function value is maintained with the corresponding filter state and image, while the other result is discarded (e.g. by optimizer module 216). The end of this imaging sequence provides an optimal image and filter state.

Various calibrations of the system may be carried out one or more times, as required in the same way as described in the flow chart in FIG. 3. For manufacturing tolerances, a calibration procedure or process can be done only once for each projector imaging system, and the optimal filter state can be stored in the memory module.

Figure 4:
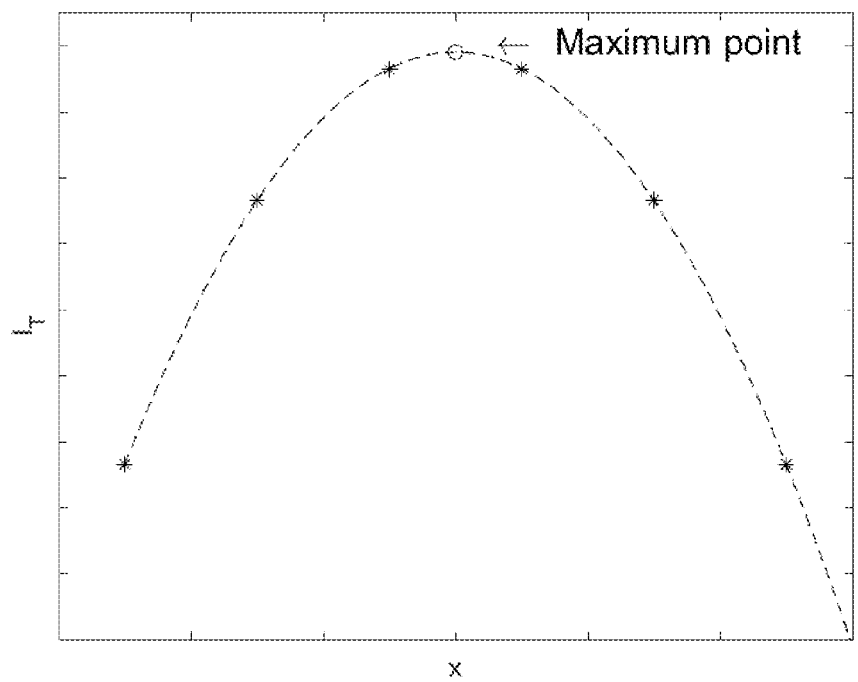
FIG. 4 depicts an example of a cost function $I_T$ as a function of the tunable filter's state.

As an example of a possible optimization, FIG. 4 depicts the cost function $I_T$ at several of the filter's tunable states. A fit polynomial could then be applied to such point, and the optimal state at which $I_T$ is at maximum, could be derived from it.

In summary, according to a method disclosed herein, a tunable filter's spectral response (for example the spectral response of a MEMS tunable filter) may be tuned to match the drift of the light source in a projector imaging system, and specifically in an IR projector imaging system, and thus it enables us to achieve a FWHM closer to that of the light source. Each time the system is used, one can compensate for the current drift of the light source and find the filter state in which the filter spectra overlaps that of the light source. A method disclosed herein allows one to considerably improve the performance of the imaging system by reducing light leakage, thus also improving the ER value of the system.

Applying a method disclosed herein to the example discussed in the Background section (for Osram's 810 nm LED SFH 4780S0), the ER value could be considerable improved by at least 25%. In another example with structured light systems which use a projected light pattern, reducing the ambient light leakage increases the contrast of the projected pattern and thus improves the system performance.

In some imaging system 200 may include a programmable computer device (e.g. controller 208), capable of being configured (e.g. programmed) to implement a method of auto-homing a tunable filter in an imagining that includes a light projected as disclosed herein above including with reference to FIG. 3. Once a the image system (e.g. controller 208) is programmed to perform particular functions pursuant to computer-executable instructions from program software that implements the method disclosed herein, it in effect becomes a special purpose computer particular to some embodiments of the method of the presently disclosed subject matter.

The methods and/or processes disclosed herein may be implemented as a computer program product such as, for example, a computer program tangibly embodied in a data storage device, for example, in a non-transitory computer-readable or non-transitory machine-readable storage device, for execution by or to control the operation of, a data processing apparatus including, for example, one or more programmable processors and/or one or more computers. The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing some embodiments of a method of the presently disclosed subject matter.

There may be provided a system that may include an image sensor, a tunable spectral filter, the tunable spectral filter may be positioned in a common optical path between an object and the image sensor—so that the camera images the object through the tunable spectral filter. The system may also include a controller that is configured and operable to set the tunable spectral filter in a plurality of operation states correlated with a plurality of spectral bands.

The system may also include a non-tunable spectral filter that may be integrated into the common optical path. The non-tunable spectral filter may have one or more spectral transmission windows.

Different operation states of the tunable spectral filter may differ from each other by the transmitted radiation bands such as but not limited to red, clear/white, infra-red, near-infra-red or any other color.

The sensor may be monochromatic or non-monochromatic.

The tunable spectral filter may be a Fabry-Perot tunable spectral filter, may be a MEMS based Fabry-Perot tunable spectral filter, and the like.

The controller may change the operation states of the filter in a pre-defined manner—for example according to a pre-defined exposure scheme.

The controller may process one or more image acquired by the camera and determine to change the operation states of the filter based on an outcome of the processing of the image. The determining may be responsive to history of previous changes of the operation states of the tunable spectral filter.

For example—if certain previous changes succeeded to improve the acquired image—then such certain previous change may be applied.

For example—if the change is required because of a lack of differentiation between different objects—the changes that assisted in a differentiation may be applied. The change may be selected based on the feature (such as a color shared by the different objects) of the different objects. If, for example, two objects share a same color (for example red) then the tunable spectral filter may be set to reject the red color and allow another spectral band to be passed by the tunable spectral filter. If, for example, one of these objects may be characterized by another color that is not included in another object—then the tunable spectral filter may be set to pass that other color.

There may be provided an adaptive process for determining, based on one or more attributes of images, the required new operation state of the tunable spectral filter.

Figure 5:
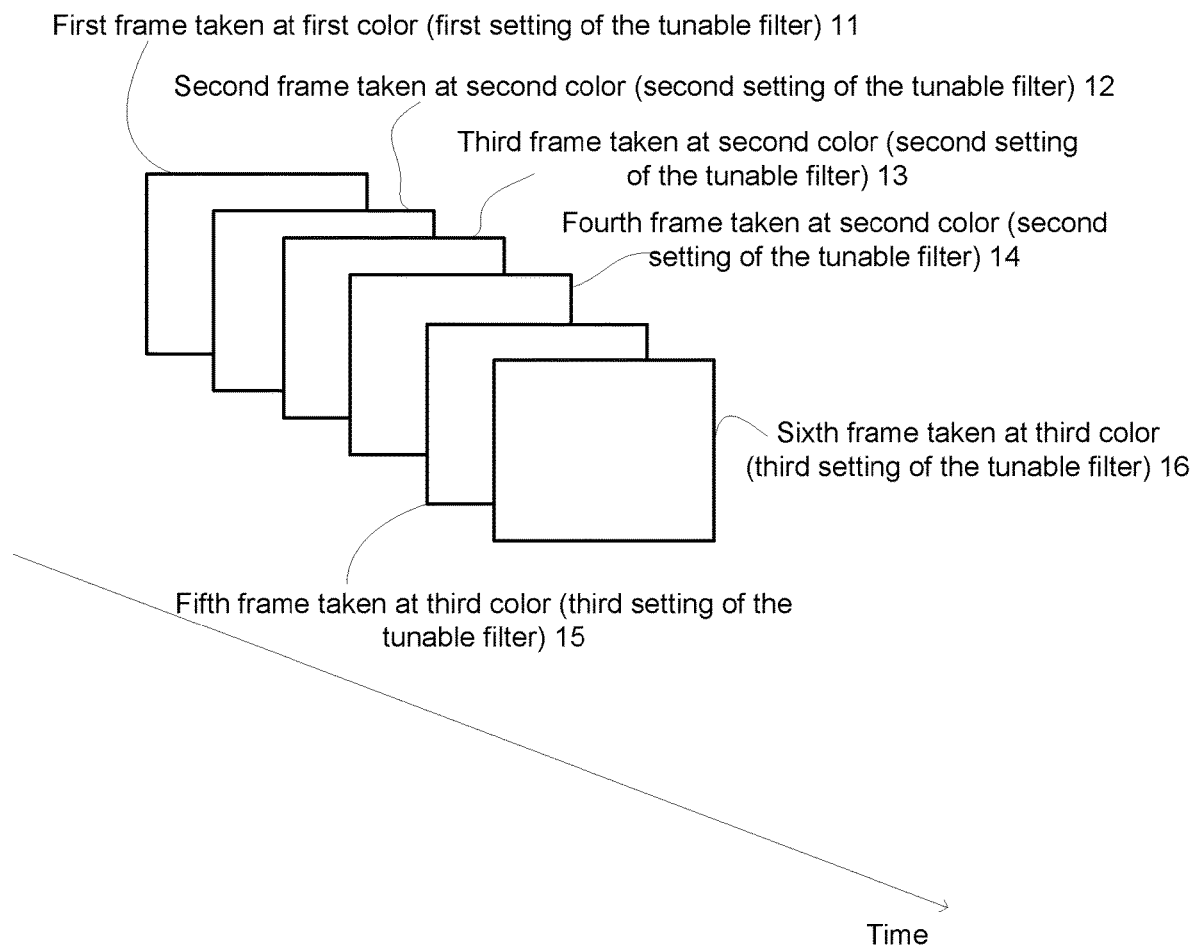
FIG. 5 illustrates an example of a sequence of images.

FIG. 5 illustrates an example of general operation of the tunable filter. A sequence of images (frames) 11, 12, 13, 14, 15, 16 are acquired at different points of time at one or more operation states of the tunable spectral filter. As can be appreciated, these images may be acquired at the same operation state, namely images that are acquired at different time points by sensing the same wavelength band. However, images at different time points may be acquired at different operations states, namely images that are acquired by sensing different wavelength bands. In the example provided in FIG. 5 first frame 11 was taken at a first color (first setting of the tunable filter). Second frame 12 was taken at a second color (second setting of the tunable filter). Third frame 13 was taken at a second color (second setting of the tunable filter). Fourth frame 14 was taken at a second color (second setting of the tunable filter). Fifth frame 15 was taken at a third color (third setting of the tunable filter). Sixth frame 16 was taken at a third color (third setting of the tunable filter). (@Some one requested to amend this—although this description and follows the figures of the provisional patent)

Figure 6:
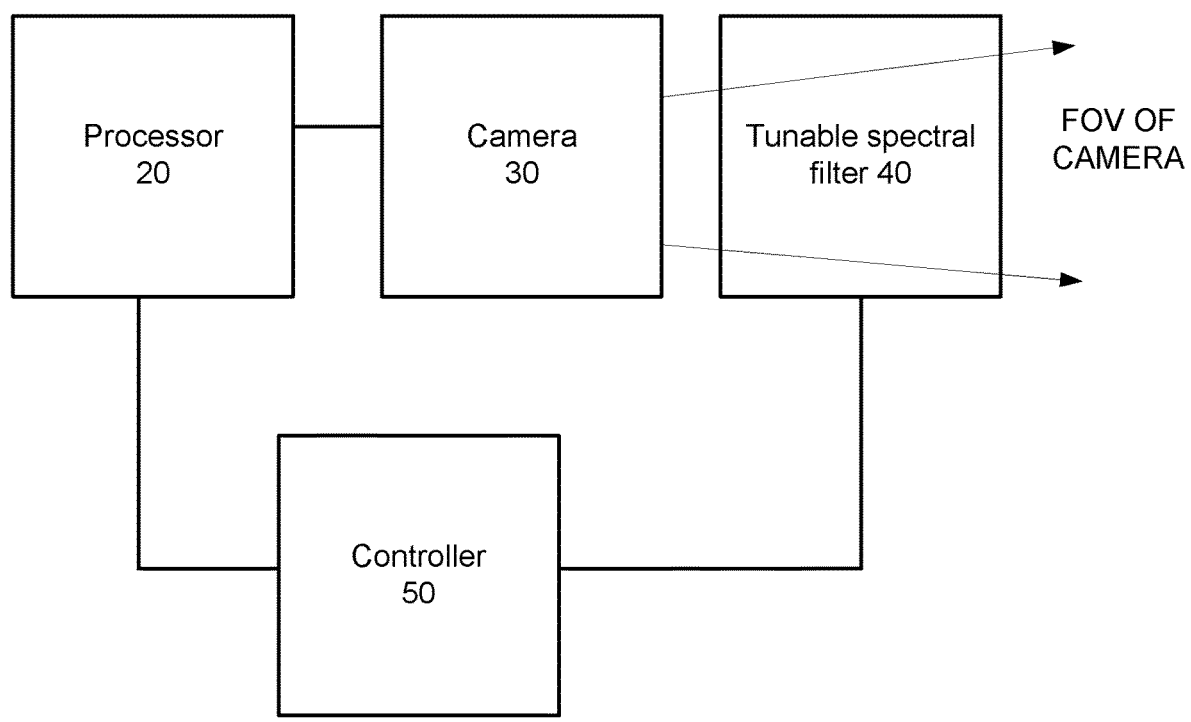
FIG. 6 illustrates an example of a system.

FIG. 6 illustrates an example of a system that includes an image sensor such as camera 30, a tunable spectral filter 40, the tunable spectral filter may be positioned in a common optical path between an object and the image sensor—so that the camera (having a field of view FOV) images the object through the tunable spectral filter. The system also includes controller 50 that is configured and operable to set the tunable spectral filter in a plurality of operation states correlated with a plurality of spectral bands. Images acquired by the camera 30 are processed by processor 20.

Processor 20 may determine the next operation states of the tunable spectral filter based on a predefined scheme, based on outcome of a processing of an image, based on history, and the like.

Additionally or alternatively the processor may also determine parameters of the camera such as an exposure scheme.

Figure 7:
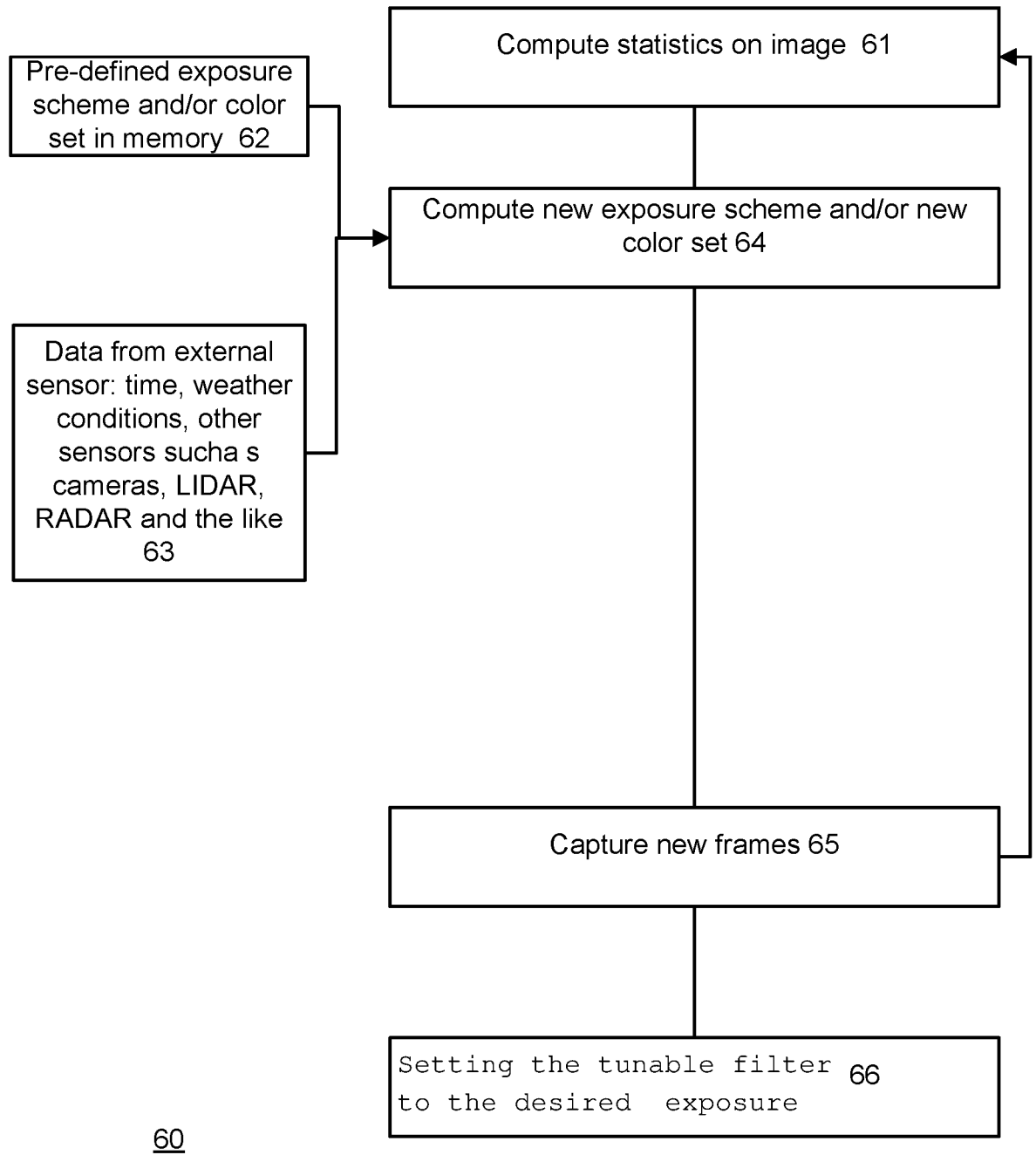
FIG. 7 illustrates an example of a method.

FIG. 7 illustrates method 60 that includes multiple steps for processing an image and determining an exposure scheme and/or a new operation state (color set) of the tunable spectral filter.

Method 60 may include the following steps:

Step 61 of computing statistics (or any other score) related to the image or to any part of the image. The statistics may refer to any parameter for example intensity or contract) of pixels of the image (or a subset of the pixels of the image). Any statistical function or non-statistical function may be applied.

Step 64 of computing new exposure scheme and/or new color set (for tuning the tunable filter).

Step 65 of capturing new frames.

Step 66 of setting the tunable filter to the desired exposure scheme. This may include continuing acquiring images.

The state that provided the best or better score of at least one criterion of the image is set for continuing the imaging process. Alternatively, the state which provided a score above a predetermined threshold at least one image criterion is maintained for continuing the imaging process.

Step 61 is followed by step 64 that is followed by step 65 that is followed by step 66. Step 64 may be fed by step 62 of providing a predefined exposure scheme and/or color set in memory. Step 64 may be fed by step 63 of receiving data from external sensors.

For example—

Let's take as a baseline example an automotive camera with red and clear exposures. Assume the baseline exposure scheme is clear, clear, clear, red [repeating].

Step 61—compute contrast per image using standard algorithms. If contrast is below the threshold, switch to a different wavelength.

Another example—compute average intensity, if too low, set tunable spectral filter to pass Infrared (IR)—allow the camera to capture IR images instead of/on top of clear/red exposures.

Step 64—in day time, plenty of light, can adjust to multiple repetitions of two images of clear (set tunable spectral filter to pass all) followed by one image of red (set tunable spectral filter to pass red).

In night time, may need five clear images followed by red image (changing the operation state of the tunable spectral filter accordingly)

Yet for another example—On a highway [high speed], no need in red exposures. In urban environment, where plenty of traffic lights, need more [red, green, clear] to better distinguish the color.

In fog, capture a clear image followed by an IR image and then a red image (and repeat).

Step 63 may provide inputs from sensors such as—speed meter, GPS, etc—the sensors are used to determine the scenario—urban/highway environment and the like. The scenario will determine the sequences of images (operation modes of the tunable spectral filter).

Step 65—there may be a need to adjust vision algorithms per new colors [for example—processor may be required to identify traffic light mode using red and green exposures].

Step 66—once processing is done, driving-related operation can be done such as break/accelerate and the like.

Figure 8:
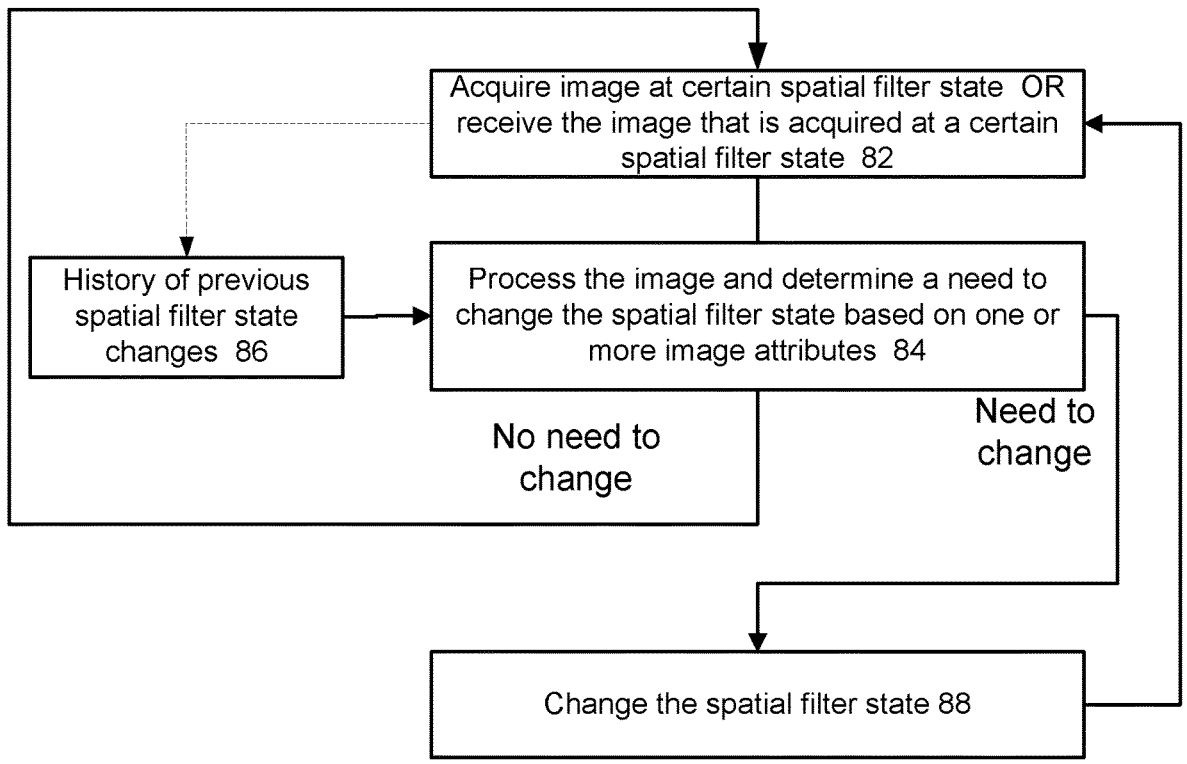
FIG. 8 illustrates an example of a method.

FIG. 8 illustrates method 80 that includes multiple steps for processing an image and determining a new operation state of the tunable spectral filter.

Method 80 may include at least one of the following steps:

Step 82 of acquiring an image at a certain spatial filter state or receive an image that was acquired at the certain spatial filter state. Step 82 is followed by step 84.

Step 84 of processing the image and determining a need to change the spatial filter state based on one or more image attribute (of the images acquired or received during step 82). The determining may be based on the predetermined threshold. That could be any threshold that was defined and once the threshold is determined the process stops and the system is set with the state that reached the predetermined threshold. If the condition of the threshold is not met, the system continues to the next state until reaches the threshold.

If there is no need to change the certain spatial filter state then step 84 may be followed by step 82.

If there is a need to change the certain spatial filter state then step 84 may be followed by step 88 of changing the spatial filter state. Step 88 may be followed by step 82.

Step 84 may be responsive to history of previous filter state changes (step 86).

Figure 9:
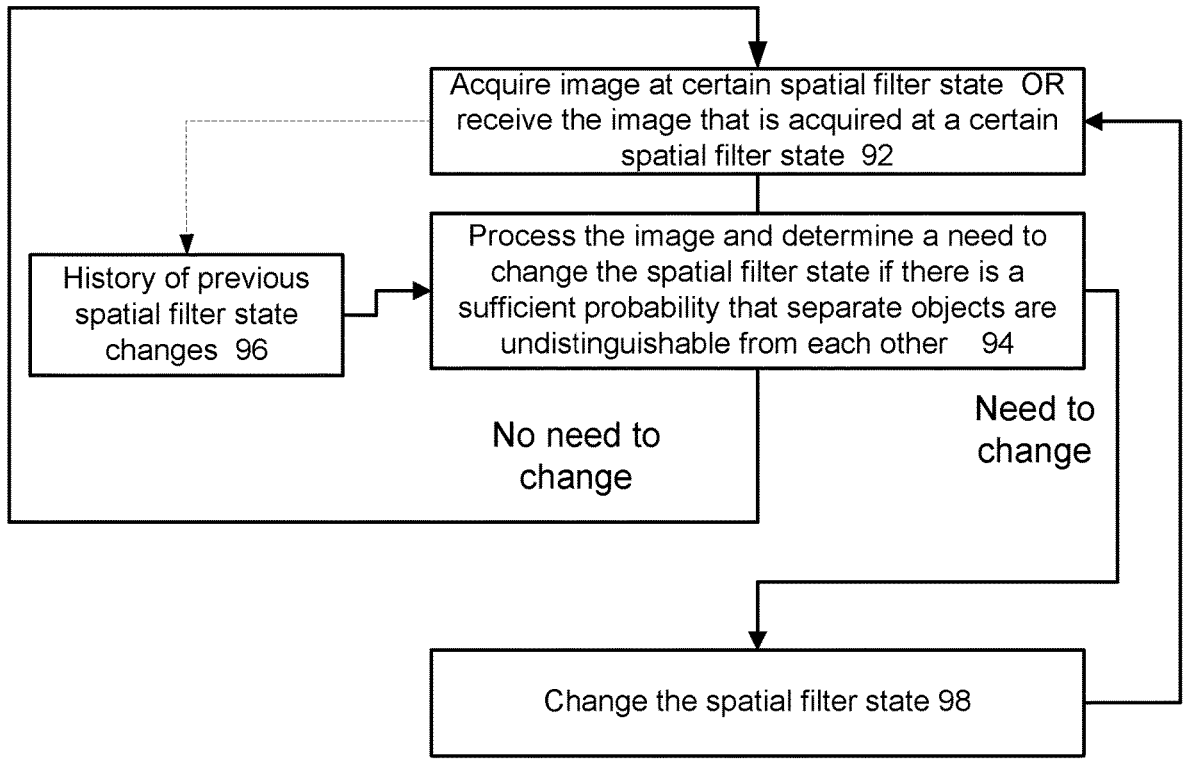
FIG. 9 illustrates an example of a method.

FIG. 9 illustrates method 90 that includes multiple steps for processing an image and determining a new operation state of the tunable spectral filter.

Method 90 may include at least one of the following steps:

Step 92 of acquiring an image at a certain spatial filter state or receive an image that was acquired at the certain spatial filter state. Step 92 is followed by step 94.

Step 94 of processing the image and determine a need to change the spatial filter state based on one or more image attribute (of the images acquired or received during step 92)—if there is a sufficient probability that separate objects are indistinguishable from each other.

If there is no need to change the certain spatial filter state then step 94 may be followed by step 92.

If there is a need to change the certain spatial filter state then step 94 may be followed by step 98 of changing the spatial filter state. Step 98 may be followed by step 92.

Step 94 may be responsive to history of previous filter state changes (step 96).

Figure 10:
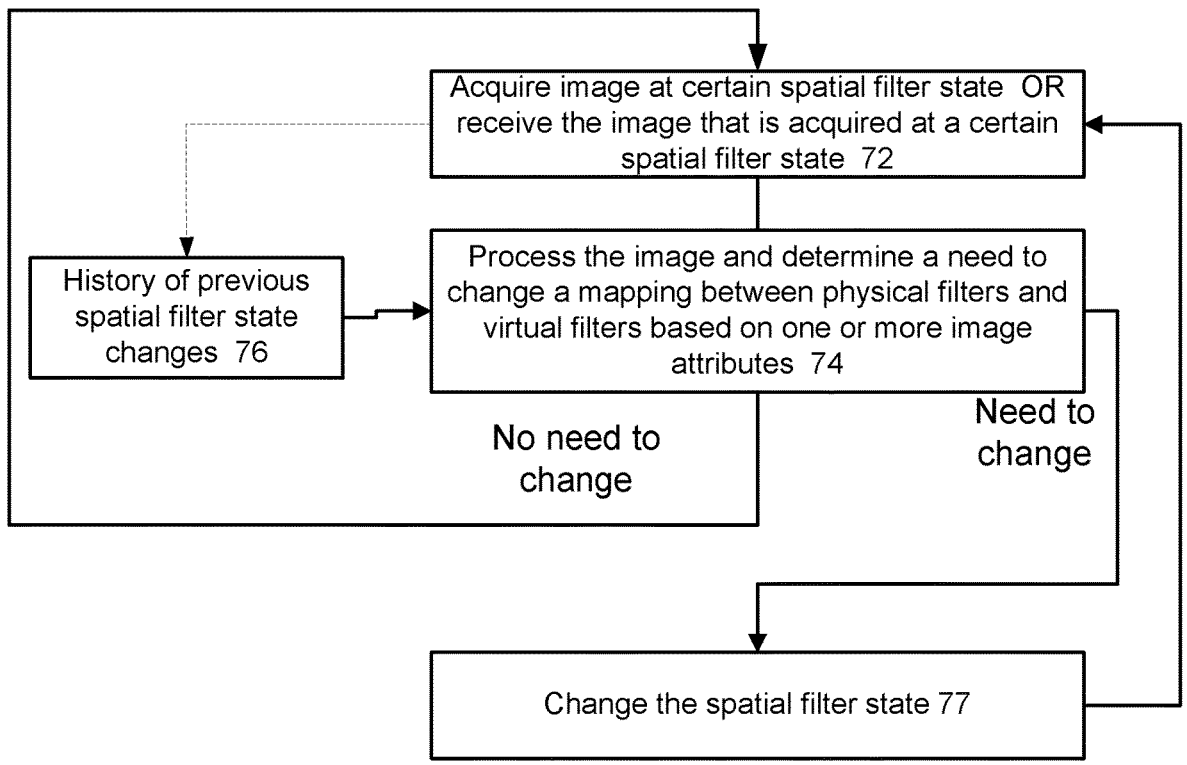
FIG. 10 illustrates an example of a method.

FIG. 10 illustrates method 70 that includes multiple steps for processing an image and determining a new mapping between physical filters and virtual filters based on one or more image attributes. The mapping map of the physical spectral response of the tunable spectral filter to virtual filters. See, for example PCT patent application WO2017/017684.

Method 70 may include at least one of the following steps:

Step 72 of acquiring an image at a certain spatial filter state or receive an image that was acquired at the certain spatial filter state. Step 72 is followed by step 74.

Step 74 of processing the image and determining (for example—based on the predefined threshold) a need to change a mapping between physical filters and virtual filters based on one or more image attribute (of the images acquired or received during step 72)—if there is a sufficient probability that separate objects are indistinguishable from each other.

If there is no need to change the certain spatial filter state then step 74 may be followed by step 72.

If there is a need to change the certain spatial filter state then step 74 may be followed by step 78 of changing the spatial filter state. Step 78 may be followed by step 72.

Step 74 may be responsive to history of previous filter state changes (step 76).

Figure 11:
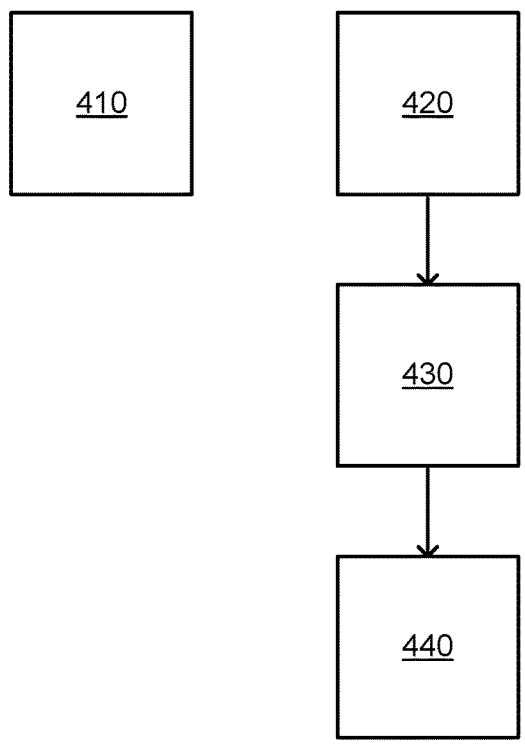
FIG. 11 illustrates an example of a method.

FIG. 11 illustrates a method 400 for setting a tunable filter.

Method 400 may start by step 410 of tuning, at different points in time, a tunable filter to different states for passing different frequency ranges.

The different states may include or can consist of a first state and a second state.

The different states may include at least three states. Step 410 may be executed in parallel to step 420.

Step 420 may include acquiring, at each state (of the different steps of step 410) at least one image of an object, by an image sensor, to provide different images of the object, wherein the acquiring occurs while a radiation source illuminates the object with radiation.

The radiation source may exhibit a frequency drift.

The tunable filter may be a narrowband filter having a bandwidth that equals a bandwidth of the radiation.

The tunable filter may be a narrowband filter having a bandwidth that differs from a bandwidth of the radiation.

Step 420 may be followed by step 430.

Step 430 may include selecting a selected setting of the tunable filter based on one or more properties of one or more images of the different images.

The one or more properties may be a signal to noise ratio.

The one or more properties may be a contrast.

Step 430 may include selecting the selected image to fulfill a desired relationship between (a) radiation from the object that originated from the radiation source and is sensed by the image sensor, and (b) ambient radiation sensed by the image sensor.

The desired relationship may be having a maximal amount of radiation from the object that originated from the radiation source and a minimal amount of the ambient radiation.

The desired relationship may be a maximal ratio between (a) an intensity of the radiation from the object that originated from the radiation source and (b) an intensity of the ambient radiation.

Step 430 may include selecting a selected setting of the tunable filter that "follows" the frequency drift of the radiation source.

The tunable filter may be a narrowband filter having a bandwidth that may be smaller than 300 nanometer.

Step 430 may include applying a cost function on the one or more properties of a subset of pixels of the one or more images.

The cost function may be an average intensity of pixels of the subset.

The method may include selecting pixels that belong to the subset.

Step 430 may be followed by step 440 of acquiring images while the tunable filter may be set to the selected setting.

Figure 12:
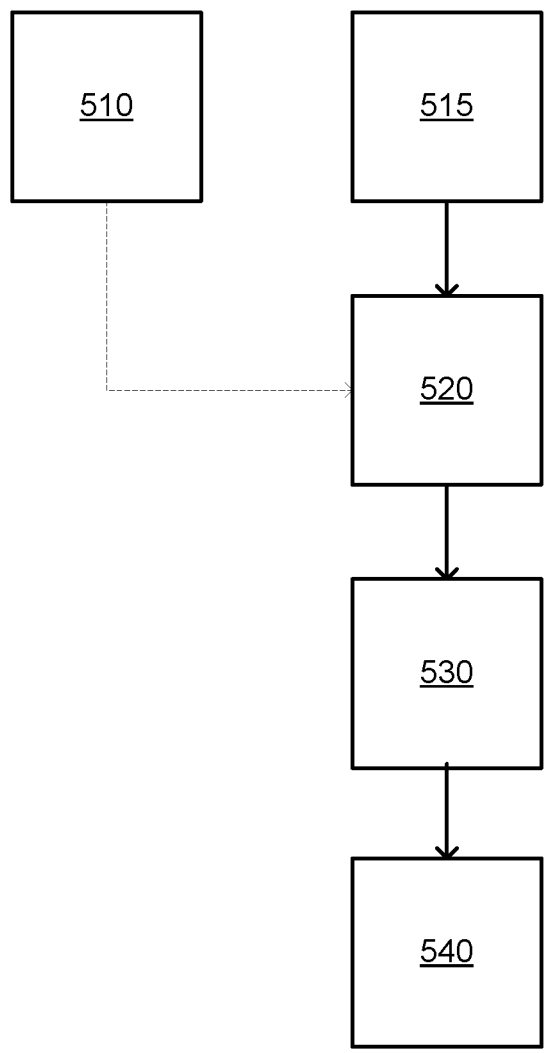
FIG. 12 illustrates an example of a method.

FIG. 12 illustrates a method 500 for autonomously tuning a tunable filter in an imaging system.

Method 500 may start by step 510.

Step 510 may include tuning the tunable filter through a plurality of filter states within at least one wavelength band.

The tunable filter may pass wavelengths of the visible and IR spectrum.

The tunable filter may be a narrowband filter having a bandwidth that is smaller than 300 nanometer.

The tunable filter may be a MEMS-based filter.

The tunable filter may be a MEMS-based filter that is an etalon.

Step 510 may include setting the tunable filter at a preliminary state within the certain wavelength band.

The certain wavelength band may range between 400-1000 nm. However, other wavelength bands may be provided—for example SWIR and LWIR ranges (up to 15 µm).

Step 510 may be preceded by receiving data indicative of environmental conditions. Step 510 may include setting the tunable filter at a preliminary state based on the data indicative of environmental conditions.

Step 510 may be executed in parallel to step 515.

Step 515 may include acquiring, by an image sensor, at each state of the plurality of states, at least one image of an object, to provide different images of the object. Step 515 may be executed in parallel to step 510.

Step 515 may be executed while at least some of the field of view of the tunable filter is illuminated within a certain wavelength sub-band with a desired wavelength band. Step 510 may include determining the plurality of states within the certain wavelength band according to the desired wavelength sub-band and an expected drift around the desired wavelength sub-band.

Step 520 may include calculating for each state of the plurality of states a state related score, the state related score being indicative of one or more properties of at least one subset of pixels of the at least one image acquired at the state, to provide a plurality of state related scores. Step 520 may follow steps 510 and 515—but may start after the acquisition of the first image.

The one or more properties of the imaging output may include at least one out of intensity, contrast, SNR, sharpness, noise, color accuracy, dynamic range, distortion, uniformity, chromatic aberration, flare, color Moire, artifacts, compression, and color gamut.

The score may be calculated based on imaging data obtained from one or more subsets of pixels of the image sensor.

The score may be calculated by applying a function maximum, the function may be constructed based on one or more of imaging output properties.

The score may be calculated by applying a predetermined threshold.

The score may be calculated by applying a cost function.

The score may be indicative of ambient light absorbed by the image sensor relative to light in a desired wavelength band absorbed by the image sensor.

Step 520 may be followed by step 530.

Step 530 may include selecting, based on at least one of the plurality of state related scores, a particular filter state that satisfies a desired score criterion.

Step 530 may be followed by step 540.

Step 540 may include setting the tunable filter for capturing images in the particular filter state.

Step 540 may be followed by acquiring one or more images.

Instead of assigning a state related score (per state) there may be assigned an image score per image (or per a subset of pixels of an image).

Figure 13:
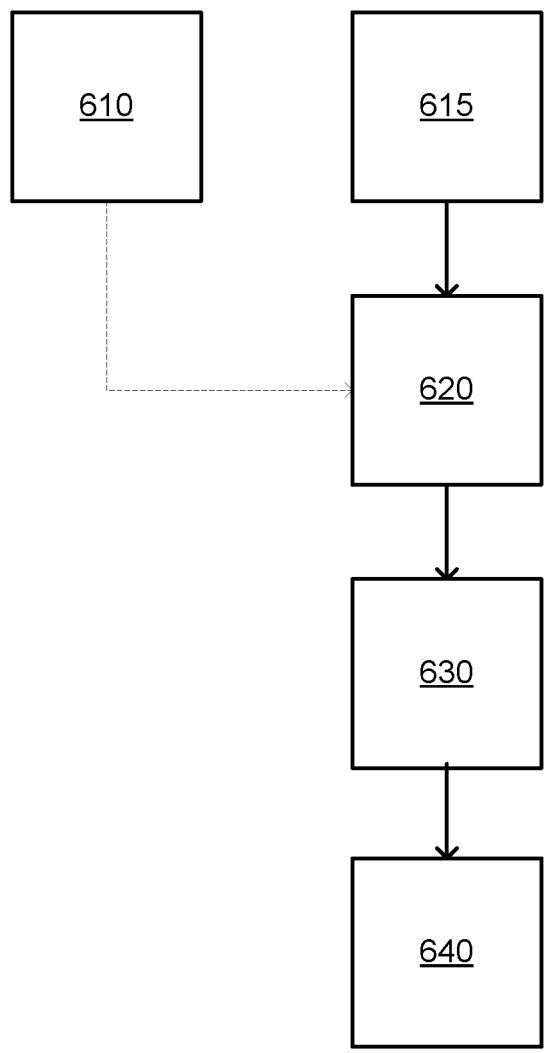
FIG. 13 illustrates an example of a method.

FIG. 13 illustrates method 600.

Method 600 may start by step 610 of tuning, by a controller of an imaging system, the tunable filter to a first plurality of filter states; wherein the spectral response of the tunable filter differs from one filter state to another.

Step 615 may be executed in parallel to step 610 and may include acquiring, by an image sensor of the imaging system, at each state of the plurality of states, at least one image of an object, to provide a second plurality of images.

Steps 610 and 615 may be followed by step 620 of calculating, by the controller, an image score, for each image of the second plurality of images, that is indicative of one or more properties of the image, to provide a second plurality of image scores. Step 620 may start after the acquisition of any image.

Step 620 may be followed by step 630 of determining, by the controller, based on the second plurality of images scores, a desired state of the tunable filter that satisfies a desired image score criterion.

Step 630 may be followed by step 640 of setting the tunable filter to the desired state, for capturing images, by the image sensor while the tunable filter is set to the desired state.

Figure 14:
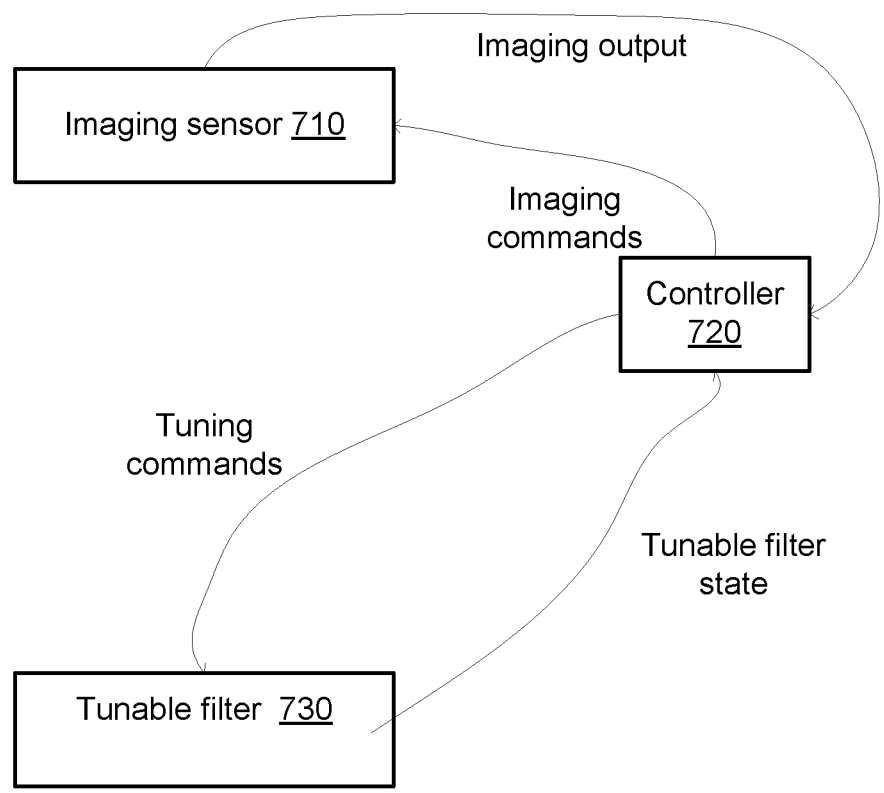
FIG. 14 illustrates an example of an imaging system.
Figure 15:
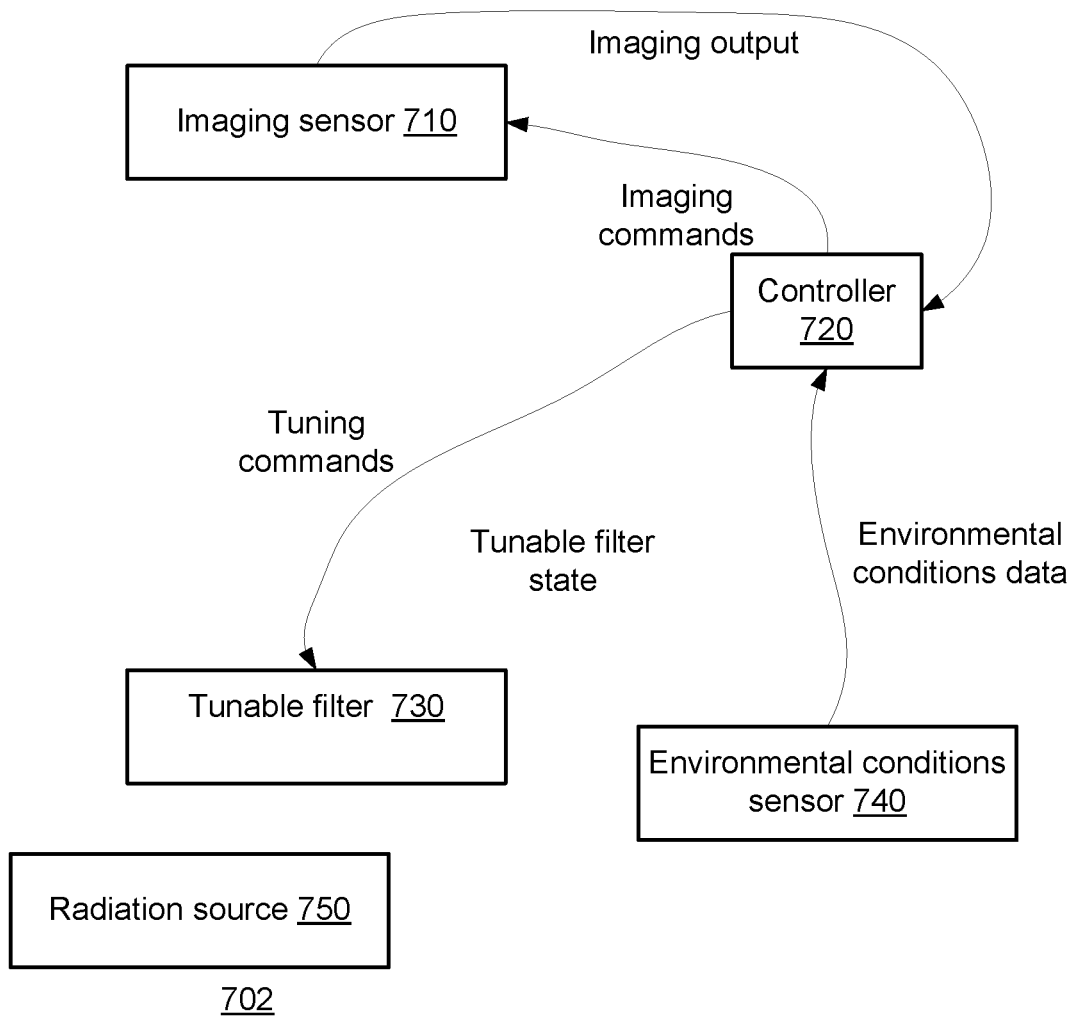
FIG. 15 illustrates an example of an imaging system.

FIG. 14 illustrates an imaging system 700 that includes imaging sensor 710, controller 720 and tunable filter 730. FIG. 15 illustrates an imaging system 702 that also includes radiation source 750 and environmental conditions sensor 740.

Each one of imaging systems 700 and 702 may be configured to execute at least some of the methods illustrated above.

Imaging sensor 710 may send imaging output (such as images, pixels of images) to controller 720.

Controller 720 may send imaging sensor 710 imaging commands for acquiring image data and/or for setting various imaging and/or image output parameters (for example which pixels should be acquired and/or outputted.

Controller may send tuning commands to tunable filter 730. Tunable filter 730 may send feedback to the controller—such as the tunable filter state.

Referring to FIG. 15—the controller may also receive environmental conditions data from environmental conditions sensors 740.

The controller may or may not control the radiation source 750. The controlling may include setting any parameter of the radiation—timing, frequency, intensity, polarization, and the like.

The various features and steps discussed above, as well as other known equivalents for each such feature or step, can be mixed and matched by one of ordinary skill in this art to perform methods in accordance with principles described herein. Although the disclosure has been provided in the context of some embodiments and examples, it will be understood by those of ordinary skill in the art that the disclosure extends beyond the specifically described embodiments to some other embodiments and/or uses and obvious modifications and equivalents thereof. Accordingly, the disclosure is not intended to be limited by the specific disclosures of some embodiments of the presently disclosed subject matter.

For example, any digital computer system can be configured or otherwise programmed to implement a method disclosed herein, and to the extent that a particular digital computer system is configured to implement such a method, it is within the scope and spirit of the disclosure. Once a digital computer system is programmed to perform particular functions pursuant to computer-executable instructions from program software that implements a method disclosed herein, it in effect becomes a special purpose computer particular to some embodiments of the method disclosed herein. The techniques that may be necessary to achieve this are well known to those of ordinary skill in the art and thus are not further described herein. The methods and/or processes disclosed herein may be implemented as a computer program product such as, for example, a computer program tangibly embodied in an information carrier, for example, in a non-transitory computer-readable or non-transitory machine-readable storage device and/or in a propagated signal, for execution by or to control the operation of, a data processing apparatus including, for example, one or more programmable processors and/or one or more computers. The term "non-transitory" is used to exclude transitory, propagating signals, but to otherwise include any volatile or non-volatile computer memory technology suitable to the application including, for example, distribution media, intermediate storage media, execution memory of a computer, and any other medium or device capable of storing for later reading by a computer program implementing some embodiments of a method of the presently disclosed subject matter. A computer program product can be deployed to be executed on one computer or on multiple computers at one site or distributed across multiple sites and interconnected by a communication network.

These computer readable program instructions may be provided to a processor of a general purpose computer, special purpose computer, or other programmable data processing apparatus to produce a machine, such that the instructions, which execute via the processor of the computer or other programmable data processing apparatus, create for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Unless otherwise stated, the use of the expression "and/or" between the last two members of a list of options for selection indicates that a selection of one or more of the listed options is appropriate and may be made.

It should be understood that where the claims or specification refer to "a" or "an" element, such reference is not to be construed as there being only one of that element.

It is appreciated that certain features of the presently disclosed subject matter, which are, for clarity, described in the context of separate embodiments or example, may also be provided in combination in a single embodiment. Conversely, various features of the presently disclosed subject matter, which are, for brevity, described in the context of a single embodiment, may also be provided separately or in any suitable sub-combination or as suitable in any other described embodiment of the presently disclosed subject matter. Certain features described in the context of various embodiments are not to be considered essential features of those embodiments, unless the embodiment is inoperative without those elements.

All patents and patent applications mentioned in this application are hereby incorporated by reference in their entirety for all purposes set forth herein. It is emphasized that citation or identification of any reference in this application shall not be construed as an admission that such a reference is available or admitted as related art.

The terms "including", "comprising", "having", "consisting" and "consisting essentially of" are used in an interchangeable manner. For example—any method may include at least the steps included in the figures and/or in the specification, only the steps included in the figures and/or the specification. The same applies to the spectral imager and the mobile computer.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the foregoing specification, the presently disclosed subject matter has been described with reference to specific examples of some embodiments of the presently disclosed subject matter. It will, however, be evident that various modifications and changes may be made therein without departing from the broader spirit and scope of the presently disclosed subject matter as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that some embodiments of the presently disclosed subject matter described herein are, for example, capable of operation in other orientations than those illustrated or otherwise described herein.

Those of ordinary skill in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures can be implemented which achieve the same functionality.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those of ordinary skill in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in some embodiments, the illustrated examples may be implemented as circuitry located on a single integrated circuit or within a same device. Alternatively, the examples may be implemented as any number of separate integrated circuits or separate devices interconnected with each other in a suitable manner.

Also, the examples, or portions thereof, may implemented as soft or code representations of physical circuitry or of logical representations convertible into physical circuitry, such as in a hardware description language of any appropriate type.

Also, the presently disclosed subject matter is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'including' does not exclude the presence of other elements or steps then those listed in a claim. Furthermore, the terms "a" or "an," as used herein, are defined as one as or more than one. Also, the use of introductory phrases such as "at least one" and "one or more" in the claims should not be construed to imply that the introduction of another claim element by the indefinite articles "a" or "an" limits any particular claim containing such introduced claim element to presently disclosed subject matters containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements the mere fact that certain measures are recited in mutually different claims does not indicate that a combination of these measures cannot be used to advantage.

Any system, apparatus or device referred to this patent application includes at least one hardware component.

While certain features of the presently disclosed subject matter have been illustrated and described herein, many modifications, substitutions, changes, and equivalents will now occur to those of ordinary skill in the art. It is, therefore, to be understood that the appended claims are intended to cover all or most such modifications and changes as fall within the true spirit of the presently disclosed subject matter.

Any combination of any component and/or unit of spectral imager that is illustrated in any of the figures and/or specification and/or the claims may be provided.

Any combination of any spectral imager illustrated in any of the figures and/or specification and/or the claims may be provided.

Any combination of any set of spectral imager s illustrated in any of the figures and/or specification and/or the claims may be provided.

Any combination of steps, operations and/or methods illustrated in any of the figures and/or specification and/or the claims may be provided.

Any combination of operations illustrated in any of the figures and/or specification and/or the claims may be provided.

Any combination of methods illustrated in any of the figures and/or specification and/or the claims may be provided.

While this disclosure has been described in terms of certain embodiments and generally associated methods, alterations and permutations of the embodiments and methods will be apparent to those of ordinary skill in the art. The disclosure is to be understood as not limited by the specific embodiments described herein, but only by the scope of the appended claims.

While this disclosure has been described in terms of certain embodiments and generally associated methods, alterations and permutations of the embodiments and methods will be apparent to those of ordinary skill in the art. The disclosure is to be understood as not limited by the specific embodiments described herein. For example, while the projector imaging system and its method of use are described in detail with reference to an IR light source and IR range tunable filter, such system and method may be equally applicable in wavelength ranges other than IR, for example the visible range.

All references mentioned in this application are hereby incorporated by reference in their entirety for all purposes set forth herein. It is emphasized that citation or identification of any reference in this application shall not be construed as an admission that such a reference is available or admitted as related art.

What is claimed is:

1. An imaging system, the system comprising:
   an image sensor;
   a tunable filter; and
   a controller operatively connected to the tunable filter and to the image sensor, wherein the controller is configured to:
      tune the tunable filter to a plurality of filter states within at least one wavelength band;
   wherein the image sensor is configured to:
      acquire, at each state of the plurality of states, at least one image of an object, to provide different images of the object;
   wherein the controller is configured to:
      calculate a state related score, for each state that is indicative of one or more properties of at least one subset of pixels of the at least one image acquired at the state, to provide a plurality of state related scores; and
      determine, based on at least one of the plurality of state related scores, a desired state of the tunable filter that satisfies a desired state related score criterion; and
      set the tunable filter to the desired state.

2. The imaging system of claim 1, wherein the one or more properties include at least one out of intensity, contrast, SNR, sharpness, noise, color accuracy, dynamic range, distortion, uniformity, chromatic aberration, flare, color moire, artifacts, compression, and color-gamut.

3. The imaging system of claim 1, wherein each state related score is calculated based on data obtained from a subset of pixels of the at least one subset of pixels.

4. The imaging system of claim 1, wherein the controller is configured to calculate a state related score of each state by applying a maximum function on the one or more properties of the at least one subset of pixels of the at least one image acquired at the state.

5. The imaging system of claim 1, wherein the controller is configured to calculate the state related score of each state by comparing the one or more properties of the at least one subset of pixels of the at least one image acquired at the state to one or more predetermined thresholds.

6. The imaging system of claim 1, wherein the controller is configured to calculate the state related score of each state to be indicative of ambient light absorbed by the image sensor relative to light in a desired wavelength band absorbed by the image sensor.

7. The imaging system of claim 1, wherein the controller is configured to set the tunable filter to a preliminary state within the at least one wavelength band.

8. The imaging system of claim 1, wherein the controller is configured to receive data indicative of environmental conditions and wherein the controller is configured to set the tunable filter at a preliminary state based on the received data indicative of the environmental conditions.

9. The imagining system of claim 1, the imaging system further comprising:
a light source configured to illuminate the object with radiation in a desired wavelength band, wherein the plurality of filter states are determined according to the desired wavelength band of the light source and an expected drift around the desired wavelength band.

10. The imaging system of claim 1, wherein the tunable filter is a narrowband filter having a bandwidth that is smaller than 300 nanometer.

11. The imaging system of claim 1, wherein the at least one wavelength band includes the visible and/or IR wavelength band, and wherein the tunable filter is an etalon MEMS-based filter.

12. A method of autonomously tuning a tunable filter in an image system, the method comprising:
using a controller for:
tuning the tunable filter through a plurality of filter states within at least one wavelength band;
acquiring, by an image sensor, at each state of the plurality of states, at least one image of an object, to provide different images of the object;
calculating for each state of the plurality of states a state related score, the state related score being indicative of one or more properties of calculate a state related score, for each state that is indicative of one or more properties of at least one subset of pixels of the at least one image acquired at the state, to provide a plurality of state related scores; and
selecting based on at least one of the plurality of state related scores a particular filter state that satisfies a desired score criterion; and
setting the tunable filter for capturing images in the particular filter state.

13. The method of claim 12, wherein the one or more properties of the imaging output includes one or more image quality factors selected from a list consisting of intensity, contrast, SNR, sharpness, noise, color accuracy, dynamic range, distortion, uniformity, chromatic aberration, flare, color moire, artifacts, compression, Dmax and color gamut.

14. The method of claim 12, wherein the calculating of a state related score, is based on imaging data obtained from a subset of pixels of the at least one subset of pixels.

15. The method of claim 12, the method further comprising:
calculating the state related score of each state by applying a maximum or cost function on the one or more properties of the at least one subset of pixels of the at least one image acquired at the state.

16. The method of claim 12, the method further comprising:
calculating the state related score of each state by comparing the one or more properties of the at least one subset of pixels of the at least one image acquired at the state to one or more predetermined thresholds.

17. The method of claim 12, wherein the state related score of each state is indicative of ambient light absorbed by the image sensor relative to light in a desired wavelength band absorbed by the image sensor.

18. The method of claim 12, the method further comprising:
receiving data indicative of environmental conditions; and
setting the tunable filter at a preliminary state based on said the data indicative of environmental conditions.

19. The method of claim 12, the method further comprising:
illuminating within the at least one wavelength band with a desired wavelength band; and
determining the plurality of states within the certain at least one wavelength band according to the desired wavelength band and an expected drift around the desired wavelength band.

20. The method of claim 12, wherein the tunable filter is a narrowband filter having a bandwidth that is smaller than 300 nanometer;
wherein the tunable filter is configured to transmit wavelengths of visible and/or IR spectrum; and
wherein the tunable filter is an etalon MEMS-based filter.

* * * * *